United States Patent
Eitel et al.

(10) Patent No.: US 9,383,396 B2
(45) Date of Patent: Jul. 5, 2016

(54) CONTROLLER AND METHOD FOR COLLISION DETECTION

(71) Applicant: Sony Corporation, Minato-ku (JP)

(72) Inventors: Ben Eitel, Gaertringen (DE); Heimo Guth, Bad Rippoldsau (DE)

(73) Assignee: Sony Corporation, Tokyo (JP)

(*) Notice: Subject to any disclaimer, the term of this patent is extended or adjusted under 35 U.S.C. 154(b) by 205 days.

(21) Appl. No.: 14/054,987

(22) Filed: Oct. 16, 2013

(65) Prior Publication Data

US 2014/0118007 A1    May 1, 2014

(30) Foreign Application Priority Data

Oct. 26, 2012 (EP) .................................. 12007384
Sep. 9, 2013 (EP) .................................. 13004387

(51) Int. Cl.
| | | |
|---|---|---|
| G01R 27/32 | (2006.01) | |
| G01R 27/28 | (2006.01) | |
| H04L 12/413 | (2006.01) | |
| G06F 1/00 | (2006.01) | |

(52) U.S. Cl.
CPC .............. G01R 27/28 (2013.01); H04L 12/413 (2013.01); G06F 1/00 (2013.01); G06F 2101/00 (2013.01); G06F 2200/00 (2013.01); H04Q 2213/13299 (2013.01)

(58) Field of Classification Search
CPC .... G06F 1/00; G06F 2101/00; G06F 2200/00
See application file for complete search history.

(56) References Cited

U.S. PATENT DOCUMENTS

| | | | |
|---|---|---|---|
| 4,706,082 A * | 11/1987 | Miesterfeld et al. | 710/240 |
| 4,730,307 A | 3/1988 | Hughes et al. | |
| 5,339,307 A * | 8/1994 | Curtis | 370/445 |
| 6,157,951 A * | 12/2000 | Vasa | H04L 49/9073 709/223 |
| 6,681,278 B1 * | 1/2004 | Jakl | G06F 1/26 710/100 |
| 6,777,825 B1 * | 8/2004 | Swart | B60R 21/01 307/10.1 |
| 8,045,916 B2 | 10/2011 | Wu | |
| 2004/0160976 A1 * | 8/2004 | Ha et al. | 370/445 |
| 2005/0197753 A1 * | 9/2005 | Miura | G07C 5/008 701/45 |
| 2006/0126451 A1 * | 6/2006 | Shinkai | G11B 27/002 369/30.3 |
| 2006/0174282 A1 | 8/2006 | Dennison et al. | |
| 2008/0063006 A1 * | 3/2008 | Nichols | H04L 12/66 370/451 |
| 2011/0208886 A1 | 8/2011 | Sugiura et al. | |

FOREIGN PATENT DOCUMENTS

| | | |
|---|---|---|
| JP | 2011-239311 | 11/2011 |
| WO | WO 2006/120203 A2 | 11/2006 |
| WO | WO 2010/122255 A1 | 10/2010 |

OTHER PUBLICATIONS

"Satellite signal distribution over a single coaxial cable in single dwelling installations", British Standard, BS EN 50494:2007, 2007, 34 pages.

The Extended European Search Report issued Feb. 27, 2014, in Application No. Patent No. 13004387.0-1853.

* cited by examiner

Primary Examiner — Huy Q Phan
Assistant Examiner — Temilade Rhodes-Vivour
(74) Attorney, Agent, or Firm — Oblon, McClelland, Maier & Neustadt, L.L.P

(57) ABSTRACT

A method for detecting a signal activity on a bus comprises measuring a current on the bus, and determining a signal activity based on the measured current.

10 Claims, 15 Drawing Sheets

CONTROLLER AND METHOD FOR COLLISION DETECTION

BACKGROUND

1. Field of the Disclosure

The present disclosure relates to a controller and a method for detecting a signal activity on a bus.

2. Description of Related Art

In systems where several individual masters can be connected to one slave, as e.g. single cable satellite antenna systems, more than one master can start to transmit data to the slave at the same time. This may lead to data collision and thereby to data loss. To guarantee a satisfactory operation of all transmitting units it is necessary to provide means to detect and avoid data collision.

In single cable satellite antenna systems, several receivers are connected to a single cable interface (SCIF). Usually up to 8 individual receivers can be connected to the SCIF. Each of them can be tuned to a different frequency. A common standard is to use the "Digital Satellite Equipment Control Bus" (DiSEqC) for the communication between the receivers and the SCIF.

According to the Single Cable standard (EN 50494:2007— Satellite signal distribution over a single coaxial cable in single dwelling installations) a supply voltage between 12.5 and 14 V is applied by each receiver or satellite receiver to the bus that connects the SCIF with the receivers as long as no control data are transmitted from the receivers to the SCIF. For each receiver the supply voltage is raised before transmitting data to a transmission voltage between 17 V and 19 V. The DiSEqC command starts after a time interval of 4 to 22 ms. After transmitting data the voltage is lowered to the supply voltage within 2 to 60 ms.

Detection and avoidance of data collision is not a part of DiSEqC standard commands. Especially for a blind channel search in a single cable environment a DiSEqC standard command collision should be detected, to avoid wrong transponder search results. During large parts of such a scan normally no transport stream can be received as the frequency positions of potential transponders, which include these transport streams, are still unknown. During the remaining parts such a transport stream might be received, but still no reference exists to decide whether the received transport stream corresponds to the frequency selected by the DiSEqC command or not.

There is a need for providing a method and a controller that are able to prevent collisions and improve collision detection without the use of transport stream information.

SUMMARY

According to an embodiment, a method for detecting a signal activity on a bus comprises measuring a current on the bus; and determining a signal activity based on the measured current.

According to a further embodiment, a method for detecting a signal activity on a bus comprises applying a test current to the bus, measuring a voltage drop on the bus, and adapting a transmission process based on the voltage drop.

According to an embodiment, a controller, that is configured to transmit data to a bus of a receiver system, comprises a voltage source configured to apply a voltage to the bus, the voltage source being configured to change a voltage applied to the bus, a sensor configured to measure a current, and a transmitter configured to adapt a transmission process of transmitting data on the bus based on a signal activity, the signal activity being determined based on the measured current.

According to an embodiment, a receiver that is operable in a single cable system and that is configured to receive satellite signals, comprises a controller. The controller is configured to transmit data to a bus of a receiver system via the controller interface and comprises a voltage source configured to apply a voltage to the bus, the voltage source being configured to change a voltage applied to the bus, a sensor configured to measure a current, and a transmitter configured to adapt a transmission process of transmitting data on the bus based on a signal activity, the signal activity being determined based on the measured current. The receiver further includes a processor configured to determine a signal activity based on the measured current.

According to an embodiment, a controller comprises a controller interface adapted to be connected to a bus of a receiver system, a sensor, wherein the sensor is adapted to apply to the bus a test current and to measure a voltage drop at the bus, and a transmitter configured to adapt a transmission process of transmitting data on the bus based on a signal activity, the signal activity being determined based on the voltage drop.

According to an embodiment, a computer program comprises computer program code means adapted to perform a method of operating a receiver, the method comprising instructing the receiver to measure a current on the bus, and instructing the receiver to determine a signal activity based on the measured current.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figures 1A, 1B:
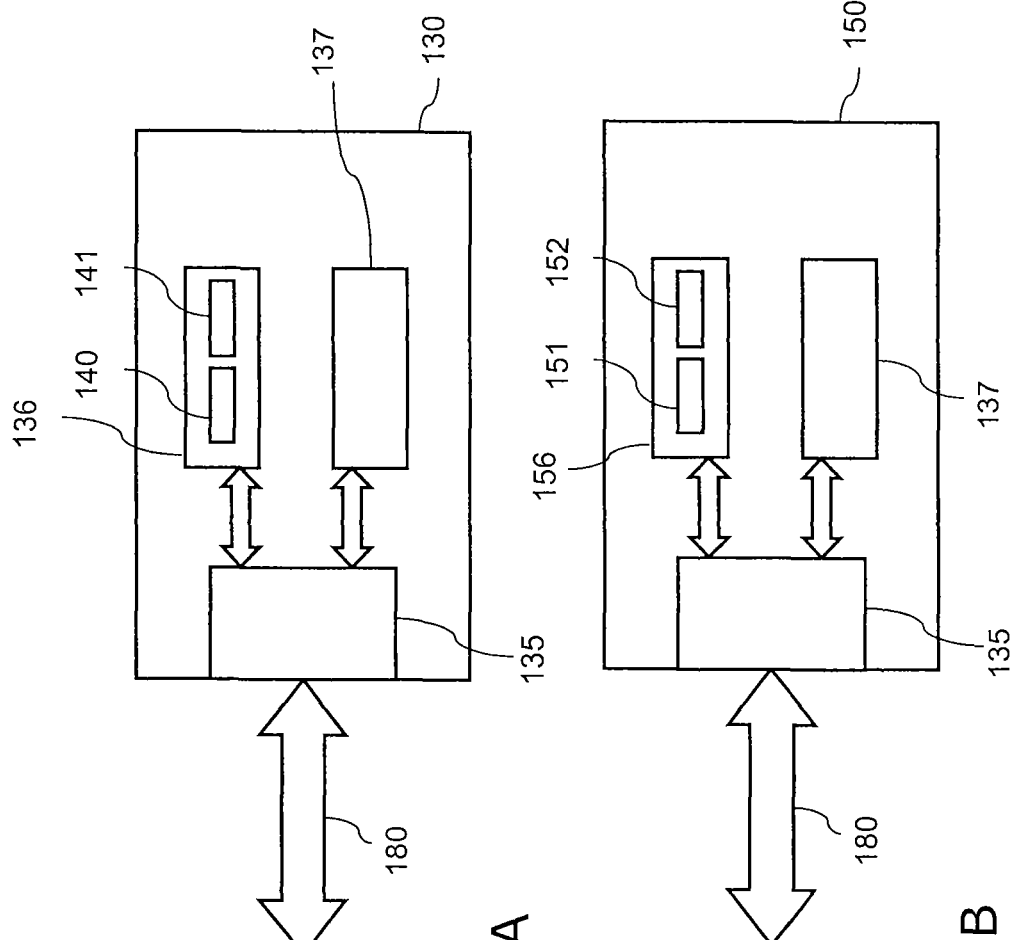
FIG. 1A illustrates a schematic block diagram of a controller according to an embodiment.
FIG. 1B illustrates a schematic block diagram of a controller according to a further embodiment.

Referring now to the drawings, wherein like reference numerals designate identical or corresponding parts throughout the several views, FIG. 1A illustrates an embodiment of a controller 130. The controller 130 includes a controller interface 135 that is connected to a bus 180 outside of the controller 130, which is connected to a system such as a satellite receiver system. The controller 130 further includes a sensor 136 with a voltage source 140 and a current sensor 141, which is connected to the controller interface 135. The voltage source 140 is configured to apply a sensing voltage to the bus 180 and the current sensor 141 is configured to measure a sensing current on the bus 180. The controller 130 further includes a transmitter 137 connected to the controller interface 135 adapted to transmit data on the bus 180.

As long as no data signal is transmitted to the bus 180 by the transmitter 137, a supply voltage is applied to the bus 180 by the controller 130. The supply voltage may in one embodiment be within a first predetermined voltage range. The first predetermined voltage range may be 12.5 V to 14 V as is specified in the Single Cable Standard. For performing a blind channel scan command data, e.g. DiSEqC control signals may be transmitted as data from the transmitter 137 to the bus 180 in a data signal. For example, a DiSEqC control signal may be transmitted after an interaction with a user, e.g. when a user wants to change a channel. According to a further example, a DiSEqC control signal could be initiated based on a pre-defined schedule for a blind channel scan on a periodic basis, for example, weekly. As long as command data is transmitted from the transmitter 137 to the bus 180, a transmission voltage that may be in a second predetermined voltage range is applied to the bus. The second predetermined voltage range may be 17 V to 19 V as is specified in the Single Cable Standard. The sensing voltage applied from the sensor 136 to the bus 180 is between the supply voltage and the transmission voltage. The sensing voltage may be in a third predetermined voltage range. For example, the sensing voltage may be higher than the largest value of the first predetermined voltage range. According to a further embodiment, the sensing voltage may be smaller than the lowest value of the second predetermined voltage range. The sensing voltage may e.g. be 14 V or the arithmetic average of the supply voltage and the transmission voltage or any appropriate voltage value from the third predetermined voltage range, which is e.g. between 14 V and 17 V when using DiSEqC control signals in accordance with the Single Cable Standard.

The current sensor 141 measures a current. From the measured current, a signal activity on the bus may be determined. Determining the signal activity may comprise comparing the measured current with a predetermined threshold. This predetermined threshold may be within a first predetermined current range. The first predetermined current range may be 0.1 to 15 mA, 1 to 15 mA or any range that is considered appropriate. The first predetermined current range may depend on the current consumption of the SCIF and the number of controllers connected to the bus 180, and may be determined by an initial or a periodic test measurement. For example, the predetermined threshold may be stored in a memory 821, which may be a component of the receiver 81. The signal activity may be determined by the sensor 136 or by any other component of the controller 130 or the receiver. According to an embodiment, transmitting command data from the transmitter 137 to the bus 180 may be only allowed if the sensing current is above a predetermined threshold in order to avoid a collision.

According to one embodiment the sensing voltage is applied to the bus 180 and the sensing current on the bus 180 is measured immediately before the transmission voltage is applied, i.e. the sensing current is measured before transmitting command data to the bus 180. Before applying the transmission voltage the voltage may also drop to the supply voltage for a short time interval. Transmission of command data may be started after a first predetermined time interval starting after the sensing current has been measured.

According to another embodiment a further sensing current is measured during transmission of command data by the sensor 136. When the transmitter 137 in the controller 130 is transmitting command data to the bus 180 and the sensing current is measured to be at or below the predetermined threshold, the transmission may be interrupted and repeated after a second predetermined time interval. The second predetermined time interval may be a random delay time as specified in the Single Cable standard. The second predetermined time interval may have a length of 20 ms or any other appropriate length. Measurement of the sensing current is performed with a sampling frequency high enough to detect influences on the sensing current based on data transmitted by another controller.

According to another embodiment the further sensing current is measured during transmission of command data by the sensor 136. The further sensing current is measured with a sampling frequency that is chosen in order to detect changes in the sensing current corresponding to the frequency of the transmitted data. By generating decoded data based on the measured sensing current, it is checked whether the measured sensing current changes in correspondence with the command data. When the generated decoded data and the transmitted command data do not agree with each other, it is assumed that also another controller transmitted data on the bus at least partly at the same time, and the transmission may be repeated after the second predetermined time interval.

According to another embodiment the sensing voltage is applied to the bus 180 and the sensing current on the bus 180 is measured immediately after transmitting command data to the bus 180. Before applying the sensing voltage the voltage may also drop to the supply voltage for a short time interval.

The sensing voltage is applied after a third predetermined time interval starting after the transmission of command data has been ended.

According to an embodiment a transmission process may be adapted in dependence from an activity on the bus 180. As a result, if more than one controller 130 is connected to the bus 180 a command data collision may be avoided. This embodiment exploits the fact that the sensing current of one controller 130 will be below the predetermined threshold as long as another controller is transmitting data signals. This will be detailed below in the description of FIGS. 2A to 2D.

According to another embodiment of a controller 150 as depicted in FIG. 1B a sensor 156 includes a current source 151 and a voltage sensor 152. The current source 151 can apply a test current to the bus 180 and the voltage sensor 152 is adapted to measure a voltage drop between the controller interface 135 and the bus 180. Then, the controller 150 may determine a signal activity on the bus 180. The transmitter 137 may be configured to only transmit command data to the bus 180 if the voltage drop is below a predetermined threshold that lies between the supply voltage and the transmission voltage. As a result, a collision of command data may be avoided. The test current may be in a second predetermined current range. The second predetermined current range may be e.g. 0.1 mA to 5 mA. The predetermined threshold for the voltage drop may be in a fourth predetermined voltage range. The fourth predetermined voltage range may include the value of 17 V or any threshold that is considered appropriate. The fourth predetermined voltage range may depend on the supply voltage of controllers connected to the bus 180, and may be determined by an initial or a periodic test measurement.

According to one embodiment the test current is applied to the bus 180 and the voltage drop between the controller interface 135 and the bus 180 is measured immediately before the transmission voltage is applied, i.e. the voltage drop is measured before transmitting command data to the bus 180. Transmission of command data is started after a first predetermined time interval starting after the voltage drop has been measured. The test current may also be applied to the bus 180 and the voltage drop may be measured after the third predetermined time interval right after transmitting command data to the bus 180.

A further voltage drop may also be measured by the sensor 156 during transmission of command data by transmitter 137 in controller 150. When the transmitter 137 is transmitting command data to the bus 180 and the voltage drop is measured to be above the predetermined threshold, the transmission is interrupted and repeated after the second predetermined time interval. Measurement of the further voltage drop is performed with a sampling frequency high enough to detect influences on the voltage drop based on data transmitted by another controller.

According to another embodiment the further voltage drop is measured during transmission of command data by the sensor 156. The further voltage drop is measured with a sampling frequency that is chosen in order to detect changes in the further voltage drop corresponding to the frequency of the transmitted data. By generating decoded data based on the measured further voltage drop, it is checked whether the measured further voltage drop changes in correspondence with the command data. When the generated decoded data and the transmitted command data do not agree with each other, it is assumed that also another controller transmitted data on the bus at least partly at the same time, and the transmission may be repeated after the second predetermined time interval.

If the bus 180 is connected to more than one controller 130, according to an embodiment the transmission process may be adapted and a command data collision may be avoided due to the fact that a voltage drop between the controller interface 135 and the bus 180 of one controller 130 will be above the predetermined threshold if another controller is transmitting data signals to the bus 180. This is detailed in the description of FIGS. 3A and 3B.

Figure 2B:
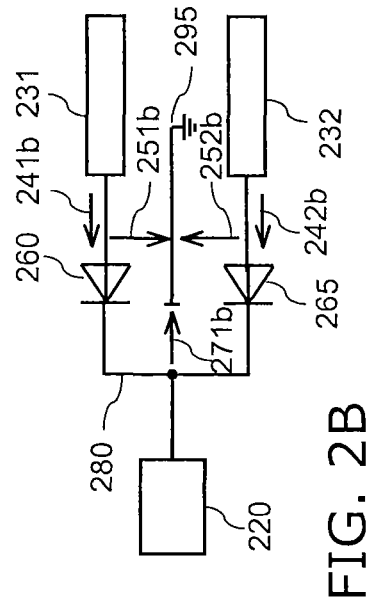
FIGS. 2A to 2D illustrate schematic block diagrams of controllers and a bus in different stages of an operation mode according to an embodiment where a sensing voltage is set and a sensing current on the bus is measured in order to detect a signal activity on the bus.
Figure 2D:
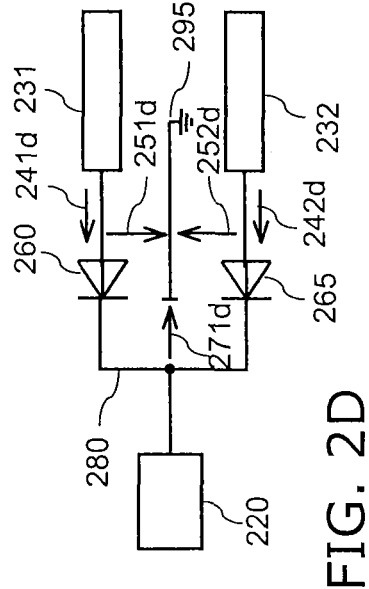
Figure 2A:
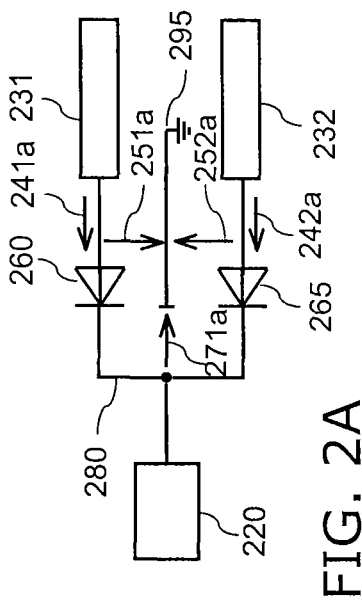
Figure 2C:
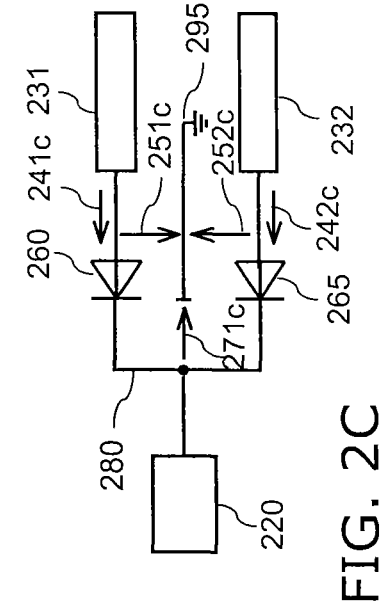

FIGS. 2A to 2C illustrate schematic block diagrams of controllers and a bus in different stages of an operation mode when performing the method of detecting a signal activity on a bus according to an embodiment.

FIG. 2A shows a first controller 231 and a second controller 232 connected via a bus 280 to a single cable interface (SCIF) 220. A first diode 260 and a second diode 265 prevent current inflow into the first controller 231 and the second controller 232. As long as neither the first controller 231 nor the second controller 232 are transmitting data signals via the bus 280 to the SCIF 220, a first voltage drop 251a between the first controller 231 and ground 295 and a second voltage drop 252a between the second controller 232 and ground 295 are equal to the supply voltage. In this situation a first current 241a and a second current 242a depend on the actual supply voltage and the power consumption of the SCIF 220.

A voltage drop 271a between the SCIF 220 and ground 295 differs from the first voltage drop 251a of controller 231 and the second voltage drop 252a of controller 232 and is slightly smaller than the larger supply voltage due to a small positive voltage drop at the current passing diode. For example, the voltage drop 271a may be equal to 12.5V in case that the larger supply voltage 251a is 13 V and a small positive current 241a passes through diode 260.

FIG. 2B illustrates the same configuration with the difference that the first controller 231 is transmitting command data to the SCIF 220 via the bus 280 while the second controller 232 is not transmitting data signals to the SCIF 220. Then, the first voltage drop 251b is equal to the transmission voltage and notably larger than the second voltage drop 252b that is equal to the supply voltage. Consequently, a larger positive current 241b is flowing into the bus 280 whereas diode 265 is blocking a negative current flow to controller 232, i.e. current 242b is approximately equal to zero.

The voltage drop 271b between the SCIF 220 and ground 295 differs from the first voltage drop 251b and the second voltage drop 252b and is slightly smaller than 18 V in the case that the transmission voltage is 18 V and the supply voltage is 13 V. Reasoning is a small positive voltage drop of e.g. 0.5 V at the current passing diode 260, whereas a larger negative voltage drop of e.g. −4.5 V occurs at the blocking diode 265.

FIG. 2C illustrates the same configuration with the difference that the sensor of the first controller 231 is applying the sensing voltage at the bus 280 while the second controller 232 is not transmitting data signals to the SCIF 220. Then, the first voltage drop 251c is equal to the sensing voltage and still clearly larger than the second voltage drop 252c that is equal to the supply voltage. Consequently, a larger positive current 241c is flowing into the bus 280 whereas diode 265 is blocking a negative current flow to controller 232, i.e. current 242c is approximately equal to zero. In this case the first current 241c is larger than the predetermined threshold value. The predetermined threshold value may be in a range from 0.1 to 15 mA, 1 to 15 mA or any threshold that is considered appropriate. Hence, no data signal on the bus 280 is detected by the sensor inside the first controller 231 and the transmitter inside the first controller 231 is allowed to transmit command data to the SCIF 220 via the bus 280.

The voltage drop 271c between the SCIF 220 and ground 295 differs from the first voltage drop 251c and the second voltage drop 252c and may be e.g. equal to 15 V in the case that the supply voltage is 13 V, and the sensing voltage is 15.5 V.

FIG. 2D illustrates the same configuration with the difference that the sensor of the first controller 231 is applying the sensing voltage to the bus 280 while the transmitter in the second controller 232 is transmitting command data to the SCIF 220 via the bus 280. Then, the first voltage drop 251d is equal to the sensing voltage and the second voltage drop 252d is equal to the transmission voltage. Since the transmission voltage is higher than the sensing voltage a positive current will flow from the second controller 232 through the second diode 265 but approximately no current will flow from the first controller 231 through the first diode 260 as this diode is blocking negative currents. Measuring the first current 241d will yield a value at or below the predetermined threshold. Hence, a signal activity or command data on the bus 280 is detected by the sensor inside the first controller 231. The transmitter inside the first controller 231 may be not allowed to transmit command data to the SCIF 220 via the bus 280. Thereby, a possible collision of the command data transmitted from the first controller 231 to the SCIF 220 with the command data transmitted from the second controller 232 to the SCIF via the bus 280 may be avoided.

The voltage drop 271d between the SCIF 220 and ground 295 differs from the first voltage drop 251d and the second voltage drop 252d and may be equal to 17.5 V in the case that the transmission voltage is 18 V, and the sensing voltage is 15.5 V.

Figure 3B:
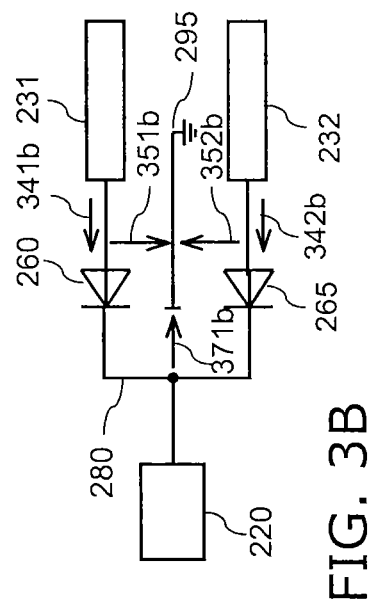
FIGS. 3A and 3B illustrate schematic block diagrams of controllers and the bus in different stages of an operation mode according to an embodiment where a test current is set and a voltage drop on the bus is measured in order to detect a signal activity on the bus.
Figure 3A:
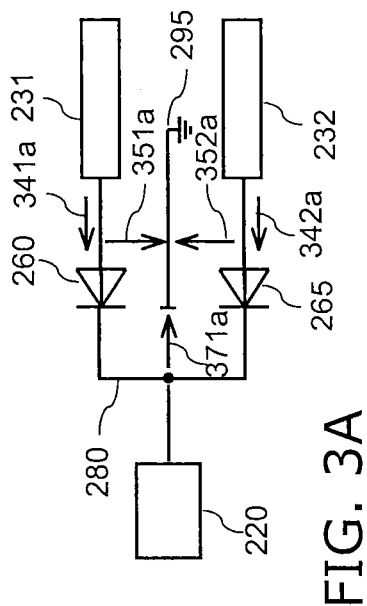

FIGS. 3A and 3B illustrate the same configuration as illustrated in FIGS. 2A to 2D with the difference that the sensors in the first controller 231 and the second controller 232 are configured to apply the test current to the bus 280. After applying the test current, a voltage drop is measured.

FIG. 3A illustrates the situation in which the sensor of the first controller 231 is applying the test current to the bus 280 while the second controller 232 is not transmitting data signals to the SCIF 220. The value of the first current 341a is within the second predetermined current range of the test current, which may be e.g. 0.1 to 5 mA, and the second voltage drop 352a is equal to the supply voltage. Then, the first voltage drop 351a will only differ marginally from the supply voltage 352a, caused by slightly different small positive voltage drops at the diodes 260 and 265. Since the first voltage 351a is below the predetermined threshold, no data signal on the bus 280 is detected by the sensor inside the first controller 231, and the transmitter inside the first controller 231 is allowed to transmit command data to the SCIF 220 via the bus 280.

The voltage drop 371a between the SCIF 220 and ground 295 differs from the first voltage drop 351a and the second voltage drop 352a and may be equal to 12.5 V in the case that the supply voltage is 13 V, and the test current is 1 mA.

FIG. 3B illustrates the situation in which the sensor of the first controller 231 is applying the test current to the bus 280 while the second controller 232 is transmitting command data to the SCIF 220 via the bus 280. The value of first current 341b is within the second predetermined current range of the test current, which may be e.g. 0.1 to 5 mA, and the second voltage drop 352b is equal to the transmission voltage. Then, the first voltage drop 351b will only differ marginally from the transmission voltage 352b, caused by slightly different small positive voltage drops at the diodes 260 and 265. Since the first voltage drop 351b is above the predetermined threshold, command data on the bus 280 is detected by the sensor inside the first controller 231 and the transmitter in the first controller 231 is not allowed to transmit command data to the SCIF 220 via the bus 280. By this, a possible collision of the command data transmitted from the first controller 231 to the SCIF 220 with the command data transmitted from the second controller 232 to the SCIF via the bus 280 may be avoided.

The voltage drop 371b between the SCIF 220 and ground 295 differs from the first voltage drop 351b and the second voltage drop 352b and may be equal to 17.5 V in the case that the transmission voltage is 18 V, and the test current is 1 mA.

Figure 4A:
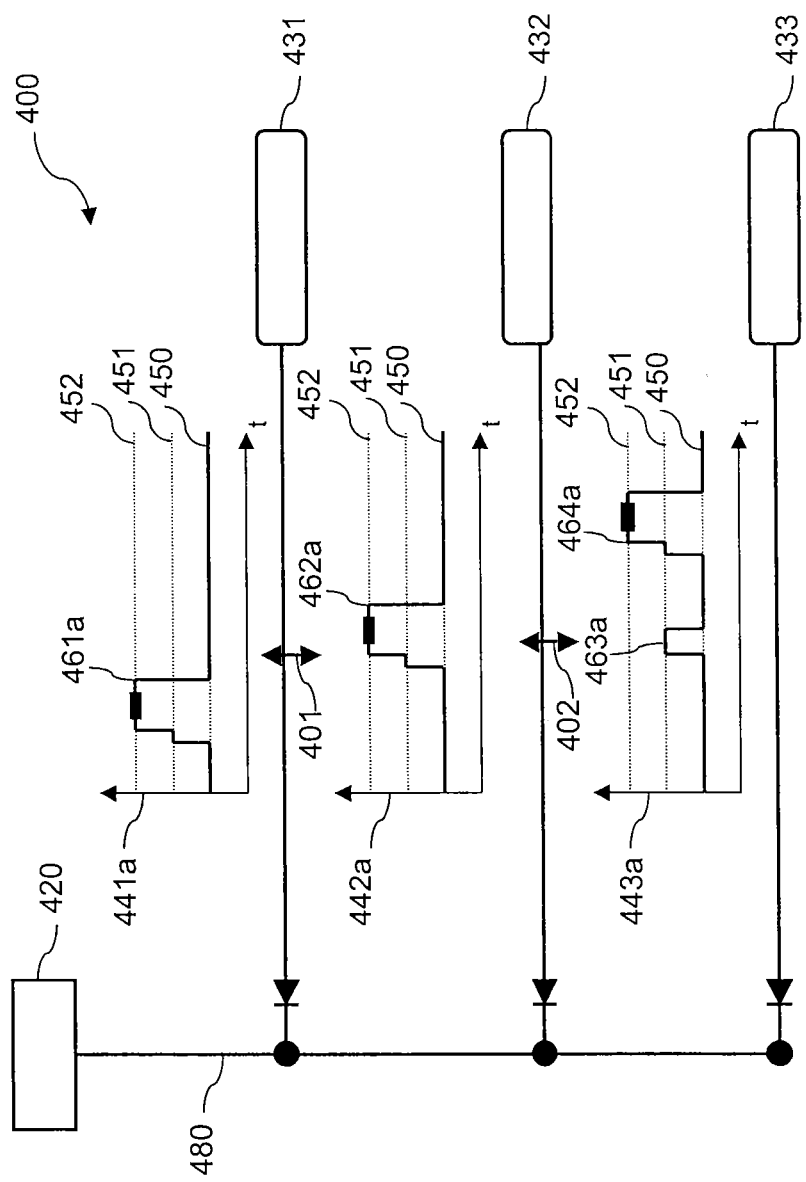
FIGS. 4A and 4B illustrate signals occurring on the bus while a signal activity is detected and data collision is avoided according to embodiments.
Figure 10:
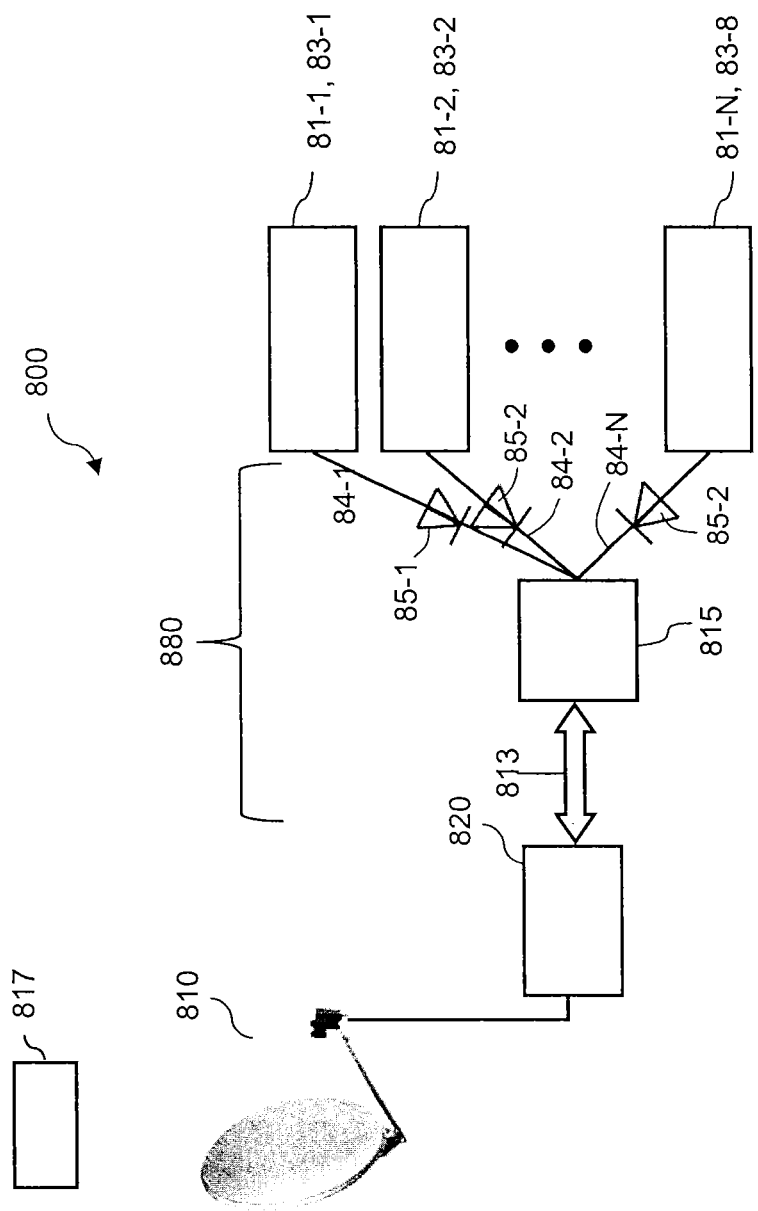
FIG. 10 illustrates one embodiment of a single cable satellite antenna system.

FIG. 4A illustrates an example of signal activities on a bus 480 in combination with a network configuration when performing the method according to an embodiment. It is to be noted that FIG. 4A illustrates an example of a network configuration. According to another example, the controllers 431, 432, and 433 may be connected via one switch to a single cable as is also shown in FIG. 10. FIG. 4A shows data signals occurring in a bus 480 according to one embodiment of a method of detecting and avoiding command data collision. A first controller 431, a second controller 432, and a third controller 433 are connected via the bus 480 with an SCIF 420. The first controller 431 is transmitting a first data signal 461a, the second controller is transmitting a second data signal 462a, and the third controller is transmitting a sensing data signal 463a and a third data signal 464a.

The data signals 461a, 462a, 463a, 464a transmitted from the controllers 431, 432, 433 to the bus 480 are illustrated in time-voltage diagrams 441a, 442a, 443a. Before and after transmitting data signals between every controller 431, 432, 433 and the bus 480 the supply voltage 450 is applied. While transmitting command data included in the data signals the transmission voltage 452 is applied. According to one embodiment immediately before transmitting command data the sensing voltage 451 is applied during the first predetermined time interval.

According to one embodiment, the first controller 431 transmits the first data signal 461a. The sensor of the first controller 431 raises the voltage from the supply voltage 450 to the sensing voltage 451. Since neither the second controller 432 nor the third controller 433 are transmitting data signals to the SCIF 420, the sensor of the first controller 431 measures a current larger than the predetermined threshold value. Thus, the first controller 431 determines that there is no signal activity on the bus 480. As this indicates that no command data collision is occurring, the transmitter of the first controller 431 raises the voltage from the sensing voltage 451 to the transmission voltage 452 and starts transmitting command data to the SCIF 420.

After the transmission by the first controller 431 has been ended and the voltage has been re-set to the supply voltage 450 the second controller 432 transmits the second data signal 462a to the SCIF 420. The sensor of the second controller 432 raises the voltage from the supply voltage 450 to the sensing voltage 451 and measures the sensing current. As neither the first controller 431 nor the third controller 433 is transmitting data signals to the SCIF 420, the sensing current is larger than the predetermined threshold value. Therefore, the second controller 432 determines that there is no signal activity on the bus 480. Hence, transmission is allowed and the transmitter of the second controller 432 raises the sensing voltage 451 to the transmission voltage 452 and transmits command data included in the second data signal 462a. After transmitting command data the voltage is lowered to the supply voltage 450. As indicated by the arrow 401 no collision between the first data signal 461a and the second data signal 462a has occurred.

During transmission by the second controller 432 the third controller 431 is sensing the bus by means of the sensing data signal 463a. Therefore, the sensor of the third controller 433 is raising the voltage from the supply voltage 450 to the sensing voltage 451 and measures the sensing current. Since the transmitter of the second controller is transmitting command data to the SCIF 420, the sensor of the third controller 433 measures a sensing current at or below the threshold value. The third controller 433 determines that there is a signal activity on the bus 480. Hence, the transmitter of the third controller 433 is adapting the transmission process. In order to avoid collision of command data the sensor of the third controller 433 lowers the voltage from the sensing voltage 451 to the supply voltage 450 and delays transmission of the third data signal 464a for the second predetermined time interval as is illustrated in the time-voltage diagram 453.

After the second predetermined time interval, the second controller 432 has ended to transmit the second data signal 462a to the SCIF 420 and therefore the sensing current measured by the sensor of the third controller 433 is above the predetermined threshold when the third controller 433 applies the sensing voltage again. The third controller 433 determines that there is no signal activity on the bus 480. Hence, the transmitter of the third controller 433 raises the sensing voltage 451 to the transmission voltage 452 and transmits the command data included in the third data signal 464a.

By this method the transmission process is adapted in dependence from a detected signal activity on the bus. Thereby, a possible collision, as indicated by the arrow 402, between the second data signal 462a and the colliding data signal 463a, is avoided. All three data signals 461a, 462a, 464a are sent separately to the SCIF 420 via the bus 480. Close to 100% of all possible collisions can be avoided by this method if all controllers have implemented this collision detection method. About 50% of all possible collisions can be avoided by this method if further receivers are connected to bus 480, wherein the further receivers do not support this collision detection method.

Figure 4B:
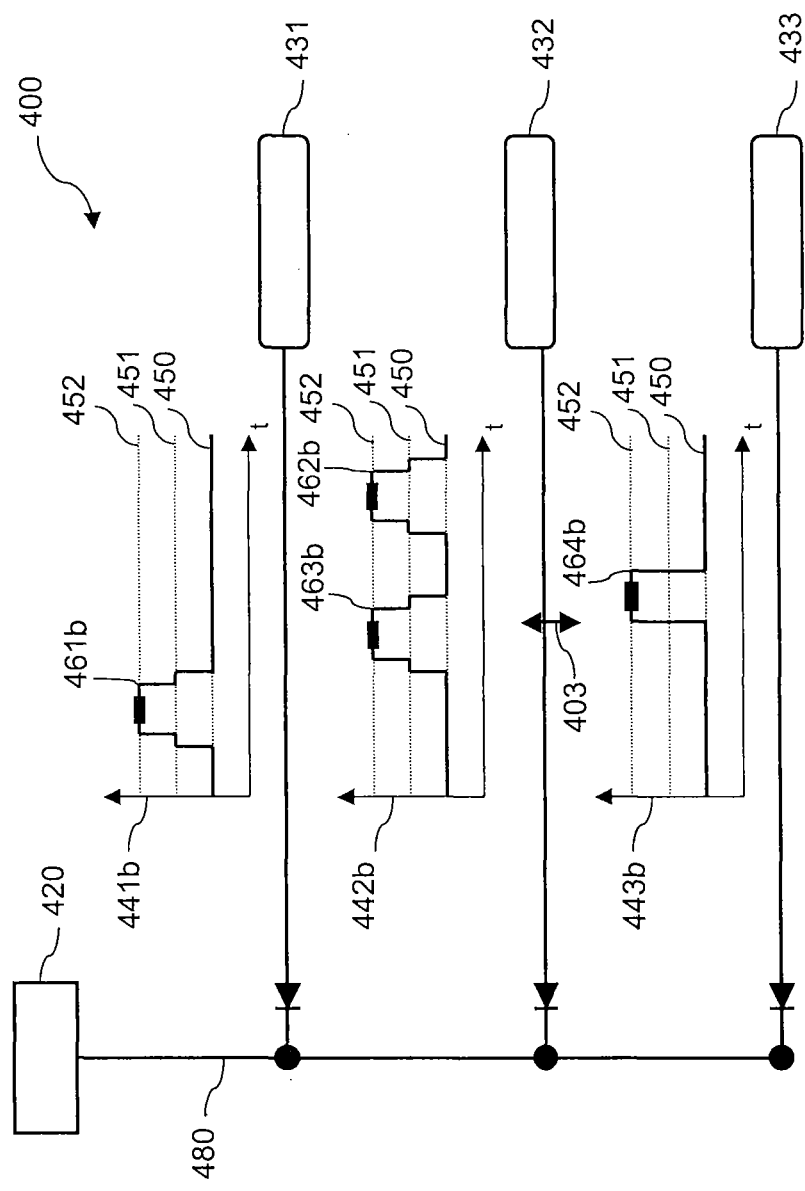

FIG. 4B illustrates an example of a signal activity in a system comprising receivers according to an embodiment and a further receiver in which a collision detection method is not implemented. FIG. 4B illustrates data signals occurring on the bus 480 according to another embodiment of a method of detecting and avoiding command data collision. The first controller 431 is transmitting the first data signal 461b, the second controller is transmitting the corrupted data signal 463b and the second data signal 462b. The third controller 433 has no collision detection method implemented. Thus, controller 433 does not sense the bus but rather directly starts to send the data signal 464b. The controller 433 may be a legacy device without collision detection support.

As is illustrated in the time-voltage diagrams 441b and 442b, the supply voltage 450 is raised to the sensing voltage 451 and the sensing current is measured before the voltage is raised to the transmission voltage 452 and the transmitters in the controllers 431, 432 transmit command data included in the data signals 461b, 463b, 462b to the SCIF 420. After transmitting command data the transmission voltage is lowered to the sensing voltage instead of the supply voltage and the sensing current is measured again. Thereby it is possible for one of the controllers 431, 432 to detect whether another controller 433 has started to transmit data signals to the SCIF 420 while the controller was still transmitting command data included in data signals to the SCIF 420.

According to one embodiment, the first controller 431 transmits the first data signal 461b to the SCIF 420. The sensor in the controller 431 raises the supply voltage 450 to the sensing voltage 451 and measures the sensing current. As no other data signal is transmitted from the second and the third controllers 432, 433, the sensing current is above the predetermined threshold. Consequently, the voltage is raised by the transmitter in the first controller 431 to the transmission voltage 452 and command data included in the first data signal 461b is transmitted from the first controller 431 to the SCIF 420. After transmitting the command data the voltage is lowered to the sensing voltage 452 by the sensor inside the controller 431 and the sensing current is measured again. Since no other controller is transmitting data signals the sensing current is again above the predetermined threshold value, no collision is detected, and the voltage is lowered to the supply voltage 450.

After the first controller has ended to transmit the first data signal 461b, the second controller 432 transmits the data signal 463b to the SCIF 420 and also detects no other transmitted data signals after having raised the voltage from the supply voltage 450 to the sensing voltage 451.

As indicated by the arrow 403, while transmitting command data included in the data signal 463b from the second controller 432 to the SCIF 420 the third controller 433 starts to transmit the data signal 464b. The controller 433 may be a legacy device without collision detection support. The controller 433 directly raises the supply voltage 450 to the transmission voltage 452 without measuring the current and without detecting a signal activity on the bus 480. As a consequence, data signal 464b is colliding with the data signal 463b leading to a corruption of both data signals 463b and 464b.

The second controller 432 ends transmitting the command data included in the corrupted data signal 463b to the SCIF 420 and the sensor of the second controller 432 lowers the voltage to the sensing voltage 451. Since the third controller 433 is still transmitting the colliding data signal 464b, the sensor of the second controller 432 measures a sensing current at or below the predetermined threshold. Consequently, the second controller 432 adapts the transmission process by lowering the sensing voltage 451 to the supply voltage 450 and waiting for the second predetermined time interval before repeating the transmission of the corrupted data signals 463b to the SCIF 420.

While the second controller 432 is waiting to repeat its corrupted signal 463b as the second signal 462b, the third controller finishes transmitting of the colliding data signal 464b and lowers the transmission voltage 452 to the supply voltage 450.

According to this embodiment the data signals 461b, 462b transmitted by controllers that implement the method for collision detection can be correctly received by the SCIF 420 although the colliding data signal 464b has corrupted the data signal 463b. Applying the sensing voltage 451 before and after transmitting command data provides therefore high probability to detect command data, as e.g. DiSEqC control signals, on the bus in order to avoid data collision, and high probability to detect collisions in order to adapt the transmission process accordingly, e.g. by re-transmission of collided command data. The sensing voltage 451 may also be applied only after transmitting command data.

By replacing in the description of FIGS. 4A and 4B applying of the sensing voltage by applying the test current and by replacing measurement of the sensing current by measurement of the voltage drop according to the description of FIGS. 3A and 3B another embodiment of a method of detecting and avoiding command data collision is described.

Figure 5:
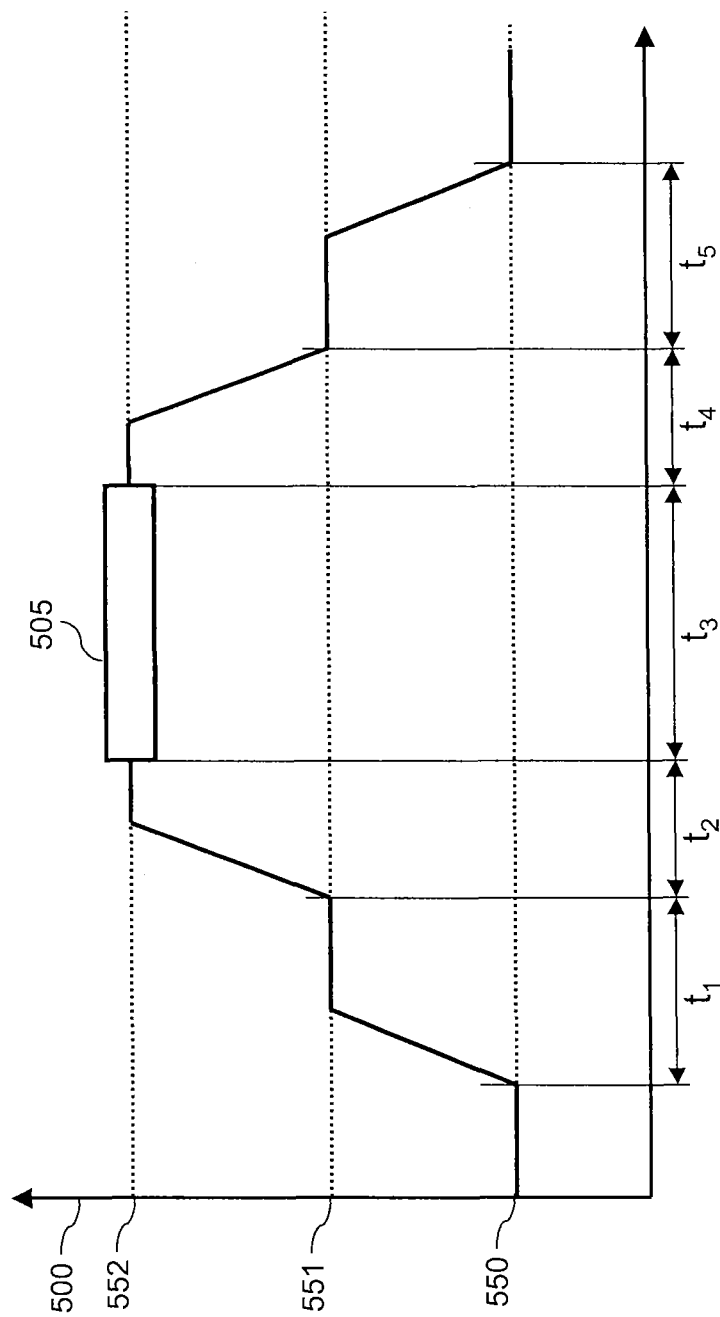
FIG. 5 illustrates a signal used to transmit data on the bus in a time-voltage diagram to illustrate an embodiment of the method of detecting a signal activity on a bus.

FIG. 5 illustrates a time-voltage diagram 500 of one of the data signals of FIG. 4B. Before and after transmission of the data signal the supply voltage 550 is applied to the bus. Within a time interval t1 the supply voltage 550 is raised to the sensing voltage 551 and the sensing current is measured.

Within a time interval t2 the sensing voltage 551 is raised to the transmission voltage 552 if the sensing current is above the predetermined threshold. The command data 505 included in the data signal is transmitted during a time interval t3.

After transmitting the command data 505 the transmission voltage 552 is lowered to the sensing voltage 551 within a time interval t4.

During the time interval t5 the sensing current is measured and the sensing voltage 551 is lowered to the supply voltage 550.

The time intervals t1, t2, t4, and t5 may be as short as possible in order to avoid overlap of data signals transmitted from different controllers that have not yet reached the transmission voltage 552 and to ensure that no controller can send data signals that are too short to be detected. The time interval t2 is the first predetermined time interval. The time interval t4 is the third predetermined time interval. For example, the time interval t2 may range from 4 ms to 20 ms, while the time interval t4 may range from 2 ms to 60 ms. The time intervals t1 and t5 may be much shorter than the sum of the time intervals t2, t3, and t4 in order to minimize the probability of a sensing voltage collision, The time intervals t1 and t5 each may be as short as possible but may also be as long as is appropriate. The interval t1 or t5 may also be absent when detection and avoidance of data collision is performed with a single measuring of the sensing current.

According to the embodiments explained above with reference to FIGS. 1A and 2A to 2D, the sensor 136 may comprise a voltage source 140 that applies a specific sensing voltage to the bus. After applying the sensing voltage to the bus, the sensing current is measured.

Figure 6:
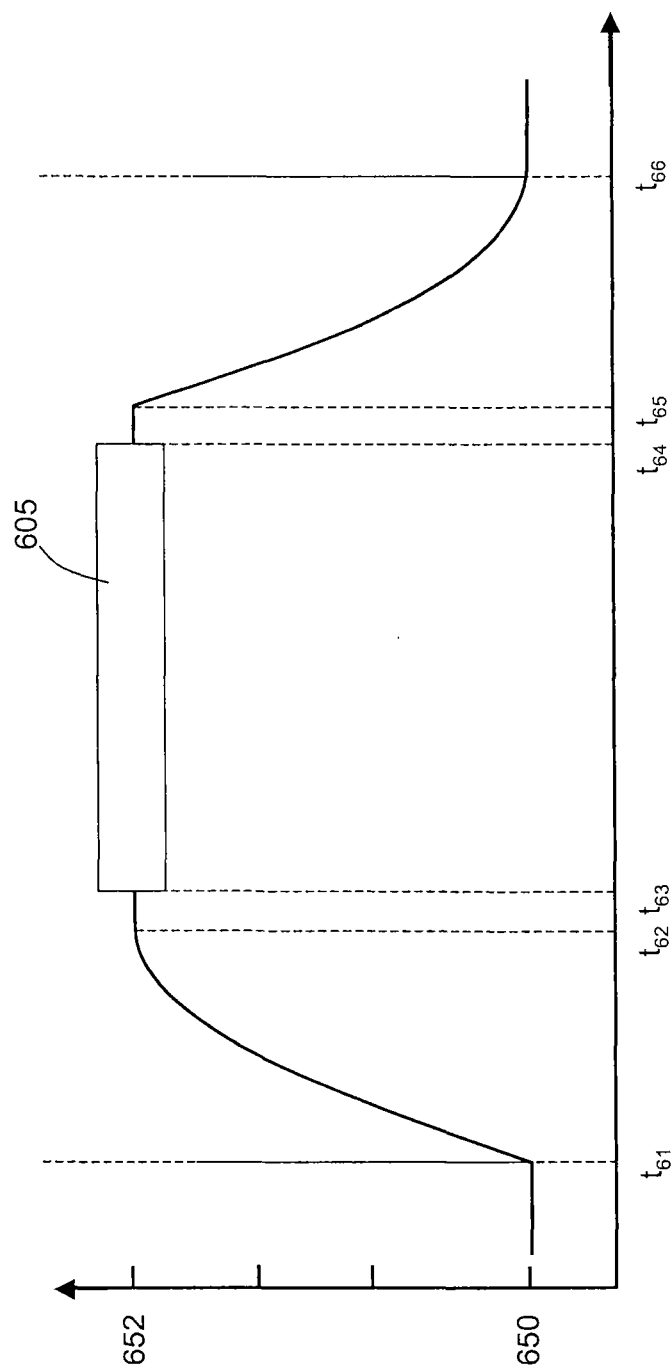
FIG. 6 illustrates a signal used to transmit data on the bus in a time-voltage diagram to illustrate a further embodiment of the method of detecting a signal activity on a bus.
Figure 7:
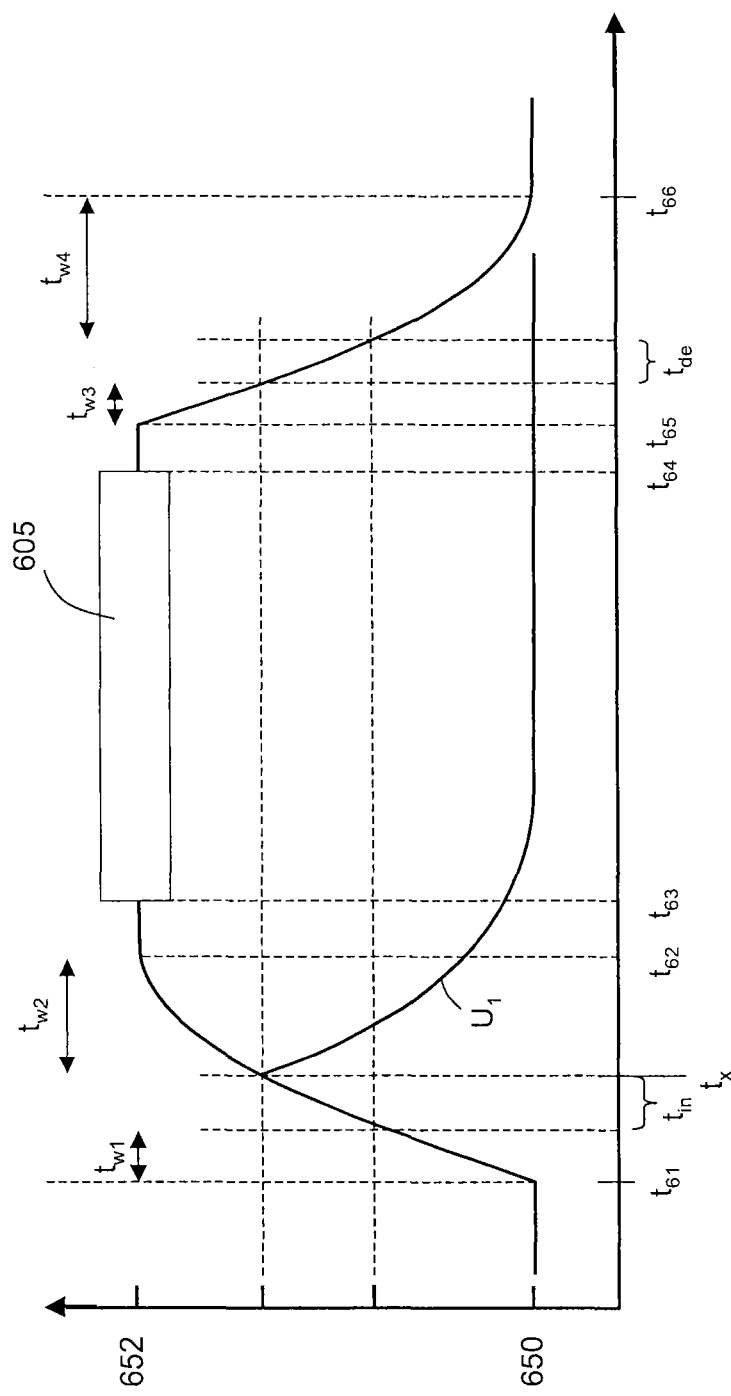
FIG. 7 illustrates a signal used to transmit data on the bus in a time-voltage diagram to illustrate still a further embodiment of the method of detecting a signal activity on a bus.

According to a further embodiment, which is illustrated in FIGS. 6 and 7, the controller may be configured to measure a current on the bus after changing a level of a voltage applied to the bus, without setting a specific sensing voltage. As has been explained above, in order to indicate the transmission of a DiSEqC command, the controller changes the voltage level from a supply voltage 650 in the first predetermined voltage range (12.5 to 14V) to a transmission voltage 652 in the second predetermined voltage range (17 to 19V). After finishing the transmission of the DiSEqC command, the voltage level is changed again to the supply voltage 650 in the first predetermined voltage range. Usually, due to capacitances present within the controller, the voltage does not increase and decrease in a step-like manner, but increases and decreases gradually with time, as shown by the voltage-time diagram shown in FIG. 6. Depending e.g. on the specific implementation of the controller and the capacitances or further electrical characteristics of components within the controller, the time from starting to increase the supply voltage to reaching the higher transmission voltage level is in a first specific range, for example, 4 ms to 22 ms. In a similar manner, when decreasing the voltage from the elevated transmission level in the second predetermined voltage range to the supply voltage in the first predetermined voltage range, the time for reducing the voltage may be in a second specific range of approximately 2 ms to 60 ms. Accordingly, the embodiments illustrated by FIGS. 6 and 7 may be implemented using e.g. commonly available controllers or receivers, wherein a sensor of the controller is configured to measure a current after the voltage applied to the bus has been changed. The signal activity is determined based on the measured current.

According to the embodiment, at any time during a first period of increasing the voltage and/or a second period of decreasing the voltage, the current may be determined by the sensor, and the signal activity may be determined based on the measured current. According to the embodiment illustrated by FIG. 7, the time interval in which the measurement may be performed may be shortened taking into account the voltage-time characteristic of the controller. According to both embodiments, the method of detecting a signal activity on the bus may be performed in a similar manner as has been illustrated in FIGS. 2A to 2D, 4A and 4B, wherein the voltage-time diagram shows a DiSEqC command pulse having edges with a gradually increasing or decreasing slope. For example, the voltage-time diagram may not have a sensing voltage "plateau" corresponding to the specific sensing voltage.

According to the embodiment illustrated by FIG. 6, the time interval between starting to change the voltage and sending the DiSEqC command may be used for measuring the current and determining an activity on the bus. Further, the time interval between finishing transmission of the DiSEqC command and reaching the voltage corresponding to the supply voltage may be used for measuring the current and determining the activity on the bus from the measured current. In FIG. 6, $t_{61}$ indicates the time at which the voltage starts to increase from the supply voltage level 650, and $t_{62}$ indicates the time at which the higher transmission voltage level 652 is reached. $t_{63}$ indicates the time at which transmission of a DiSEqC command pulse 605 is started. Transmission of the DiSEqC command pulse 605 is finished at $t_{64}$. At $t_{65}$ the voltage starts to decrease, and $t_{66}$ indicates the time at which the lower supply voltage level is reached. The time interval from $t_{61}$ to $t_{63}$ indicates a possible measurement window for measuring a current on the bus in order to detect signal activities of other receivers or controllers on the bus. Thereby, collisions may be avoided. Similarly, the interval between $t_{64}$ and $t_{66}$ designates a possible measurement window for measuring a current on the bus in order to detect signal activities of other receivers or controllers on the bus. Thereby, collisions may be avoided. For example, at a time $t_{in}$ with $t_{61}<t_{in}<t_{62}$, the controller may measure the current when increasing the voltage, and at a time $t_{de}$ with $t_{65}<t_{de}<t_{66}$, the controller may measure the current when decreasing the voltage applied to the bus. In the time intervals between $t_{62}$ and $t_{63}$ and between $t_{64}$ and $t_{65}$, the voltage is at the transmission voltage level 652. By measuring a current in these time intervals, for example, colliding commands may be detected, if the transmission voltage of these commands is higher than the transmission voltage level 652. This may, for example, be useful in cases in which another controller or receiver sends a DiSEqC command pulse having a steeper edge in the voltage time diagram.

As has been described above, determining a signal activity may comprise determining whether the measured current is higher than a predetermined threshold or not. If the current is higher than a predetermined threshold, it is determined that there is no signal activity on the bus. On the other hand, if the current is below the predetermined threshold, it is determined that there is a signal activity on the bus. The threshold may be determined in the manner that has been explained above with reference to FIGS. 2A to 2D. For determining the signal activity, it is not necessary to know the exact voltage at which the current is measured. According to an embodiment, the current may be measured during the measurement window of the raising edge, for the falling edge or for both. Differently stated, the current may be measured in a time between $t_{61}$ and $t_{62}$ or between $t_{61}$ and $t_{63}$ and/or in a time between $t_{64}$ and $t_{66}$ or $t_{65}$ and $t_{66}$. In addition or alternatively, the current may be measured in a time between $t_{62}$ and $t_{63}$ and/or in a time between $t_{64}$ and $t_{65}$, for example, when the applied voltage corresponds to the transmission voltage 652, but transmission of the DiSEqC command has not started yet or has already been finished. Optionally, such a measurement can be performed periodically. Thereby, DiSEqC commands of other devices having a steeper rising edge and/or a higher transmission voltage may be detected. For example, in case of a detection of a signal activity, the transmission of the DiSEqC command can be stopped before it is started. Thereby, a collision may be avoided. Likewise, immediately after the transmission of the DiSEqC command, when the applied voltage still corresponds to the transmission voltage 652, the current may be measured and a signal activity may be determined from the measured current. In case of a detection of a signal collision, the transmission of the DiSEqC command can be repeated after some time. Thereby, a reliability of the transmission process may be increased.

According to the embodiment illustrated in FIG. 7, the measurement window may be set taking into account a wait time interval $t_w$ after starting to change the voltage level and before measuring the current. As a result, it may be ensured that the current is measured when the voltage is larger than the supply voltage of another device. Hence, a wrong interpretation of the measured current may be avoided and the reliability of the measurement is increased. For example, the following relationship may hold: $t_{61}+t_{w1} \leq t_{in} \leq t_{63}$, wherein $t_{w1}$ designates a wait time interval after starting to increase the voltage and $t_{in}$ designates a time duration of a measurement window when increasing the voltage. Additionally or alternatively, when decreasing the voltage, the measurement may be performed a further wait time interval $t_{w4}$ before the supply voltage is reached. For example, the relationship may hold: $t_{65} \leq t_{de} = t_{66} - t_{w4}$, wherein $t_{de}$ designates a time duration of a measurement window when decreasing the voltage. As a result, it may be ensured that the current is measured when the voltage is larger than the supply voltage of another device and the reliability may be increased. According to further embodiments, when increasing the voltage level, the current may be measured a further wait time $t_{w2}$ before the transmission voltage is reached. For example, $t_{in} \leq t_{62} - t_{w2}$. As a further option, when decreasing the voltage level, the current may be measured a wait time $t_{w3}$ after starting to decrease the voltage. For example, $t_{de} \geq t_{65} + t_{w3}$.

The respective wait time intervals may in one embodiment be determined on the basis of the electrical characteristics of the controller and, optionally, the receiver.

For example, calibration measurements may be performed in order to obtain a voltage-time characteristic of the controller when increasing the voltage from the lower supply voltage level to the higher transmission voltage level and vice versa. These calibration measurements may be performed during a time when no transmissions occur or are planned. For example, the calibration measurements may be performed when a new controller or receiver is put into use at initial setup or at specified time intervals. Alternatively, the calibration measurements may be performed at the factory. From the voltage-time characteristic the respective wait time intervals $t_{w1}$ and/or $t_{w4}$ may be determined taking into account the first predetermined voltage range of usually employed receivers. By determining the wait time intervals $t_{w1}$ and/or $t_{w4}$ in this manner, the fact that other receivers present in the communication system may be operated at different supply voltages is taken into account. As a result, the reliability of the detection may be increased. Alternatively, typical values for the different wait times may be known and may be used, which further simplifies the implementation and reduces costs.

Optionally, the wait time intervals $t_{w2}$ and $t_{w3}$ may be determined so that the applied voltage is smaller than the lowest value of the second predetermined voltage range of commonly used receivers. As will be also explained below with reference to FIG. 11, according to an embodiment, the receiver may additionally comprise a memory which may store some or all of the wait time intervals determined after performing calibration measurements. According to an embodiment, some or all of the wait time intervals may be determined by the manufacturer of the controller and may be stored into the memory.

According to still a further embodiment, the voltage-time characteristic or the transient behaviour of the receiver may be set by the manufacturer. For example, the receiver may further comprise a capacitance having a specified capacitance value or any other suitable electric component which may further influence the voltage-time characteristic so as to set specified lengths of the wait time intervals.

According to a further embodiment, the wait time interval $t_{w1}, \ldots t_{w4}$ may be determined so that the measurement is performed at a voltage that lies in the third predetermined voltage range that has been explained above with reference to FIG. 1. Thereby, the reliability of the detection method may be further increased.

FIG. 7 further shows an example of a voltage-time characteristic for a case when a signal activity has been detected. According to the embodiment, after the signal activity has been detected, the receiver stops a transmission of data on the bus before starting of the transmission, thereby avoiding a collision. As is illustrated by curve $U_1$, the voltage therefore drops beginning at a time $t_x$ until it reaches the lower supply voltage level.

According to an embodiment, the current may be measured during transmission of command data as has been explained above with reference to FIGS. 1A and 1B. According to this embodiment, the command data on the bus may be captured by measuring the current. Then, the command data are decoded. The decoded data and the transmitted command data are compared and if they do not agree with each other, it is assumed that also another controller transmitted data on the bus at least partly at the same time. As a result, the transmission may be repeated after the second predetermined time interval.

According to the embodiments disclosed, the controller may comprise a voltage source that is configured to apply a voltage to the bus, the voltage source being configured to change a voltage applied to the bus. The controller further includes a sensor configured to measure a current after the voltage applied to the bus by the voltage source has started to change, and a transmitter configured to adapt a transmission process of transmitting data on the bus based on a signal activity, the signal activity being determined based on the measured current. According to an embodiment, the voltage source may form part of a transmitter part of the receiver which normally applies a transmission voltage to the bus when starting a transmission process. The sensor may be a commonly used current sensor integrated within the controller.

According to a further embodiment, a receiver that is operable in a single cable system and which is configured to receive satellite signals may comprise the controller as described above and a processor or circuitry that is configured to determine a signal activity based on the measurement current. The receiver may further include a memory which may store, for example, one or more wait time intervals. The receiver may further comprise an additional capacitance or electrical components which may influence the voltage-time characteristics. The memory may also store a voltage-time characteristic of the controller and/or a predetermined threshold for determining whether there is a signal activity on the bus. As is clearly to be understood, the controller itself may additionally comprise any of these components.

According to a further embodiment, a method of operating a receiver or controller may comprise instructing the controller to change a level of a voltage applied to the bus and, thereafter, to measure a current on the bus. The method may further comprise instructing a component of the receiver to determine a signal activity based on the measured current. According to an embodiment, the processing device may perform the method of operating the receiver. For example, the processing device may determine the signal activity based on the measured current.

According to a further embodiment, a computer program may comprise computer program code means adapted to perform the method of operating the receiver or controller as explained above, when the program is run on a computer or processor.

Figure 8:
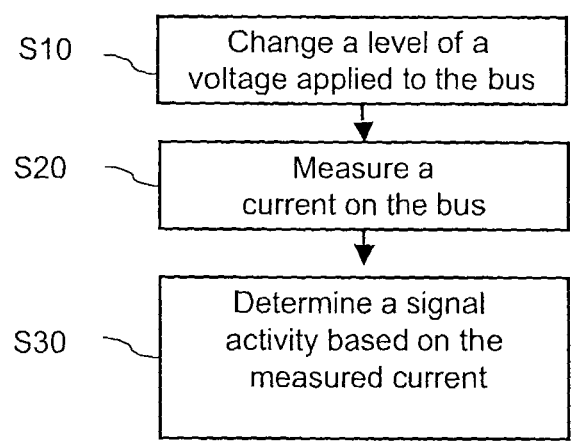
FIG. 8 illustrates a process flow of a method according to an embodiment.

FIG. 8 illustrates a process flow of a method of detecting a signal activity on a bus according to an embodiment. The method includes changing a level of a voltage applied to the bus (S10), measuring a current on the bus (S20), and determining a signal activity based on the measured current (S30). The method may be incorporated into a general process of transmitting command data such as e.g. DiSEqC control signals, from a receiver or a controller of a receiver to an interface, for example, a single cable interface via a bus including a single cable.

Figure 9A:
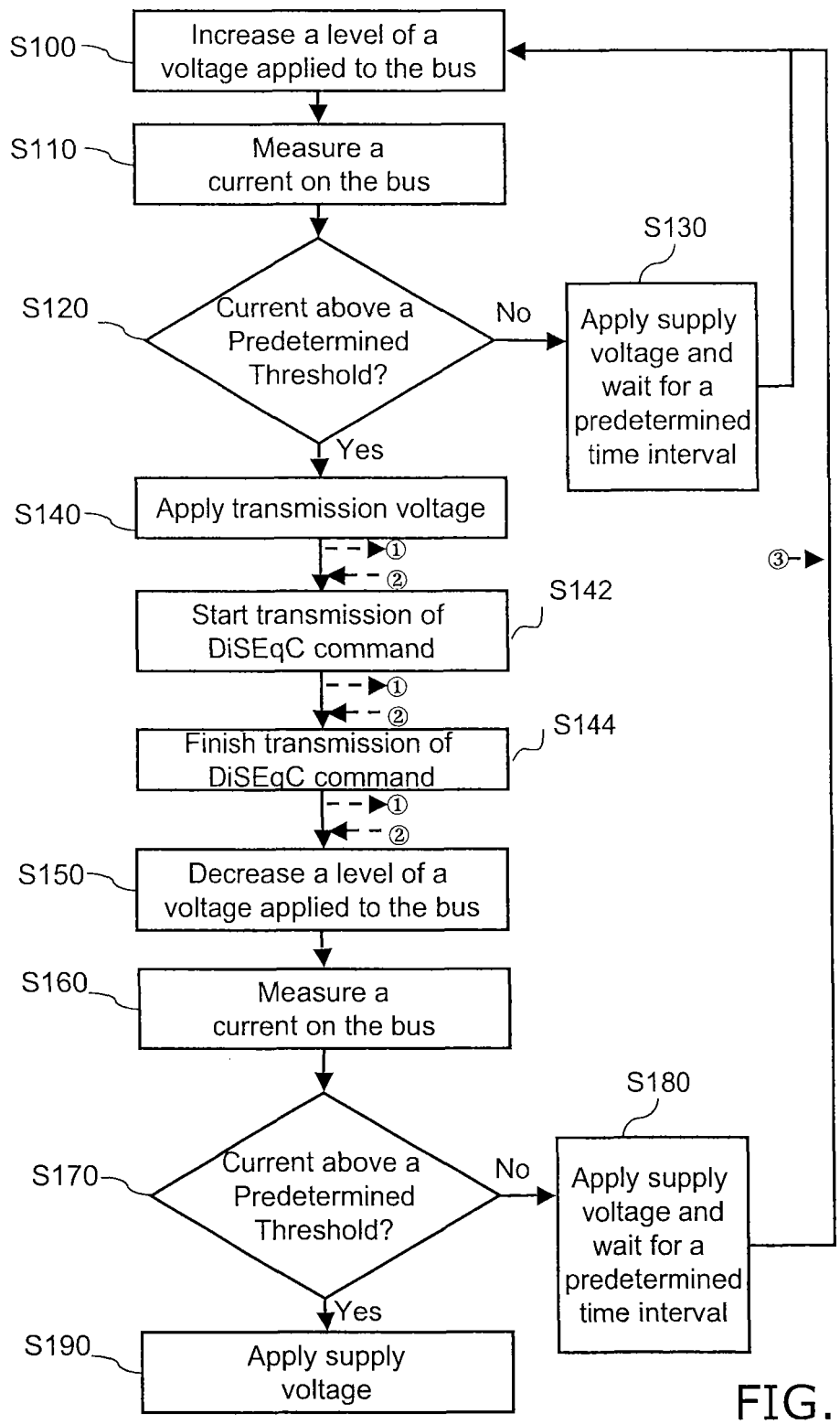
FIG. 9A illustrates one embodiment of a process flow of a method of detecting a signal activity and avoiding data collision by measuring a sensing current before and after transmission of data.

FIG. 9A illustrates a process flow of a method of detecting a signal activity, for example, command data, such as DiSEqC control signals, on a bus and avoiding data collision by changing a level of a voltage on the bus and measuring the current on the bus, utilizing the method explained with reference to FIGS. 4A and 4B.

At S100 a level of the voltage applied to the bus is increased.

At S110 the current is measured on the bus.

At S120 it is determined whether the current is above or below the predetermined threshold.

If the current is not above the predetermined threshold (No) at S130 the supply voltage is applied to the bus and return to S100 is delayed for the second predetermined time interval.

If the current is above the predetermined threshold (Yes) at S140 the transmission voltage is applied. At S142, the transmission of command data through the bus to the SCIF is started. Optionally, before S142, the procedure may jump to S145 shown in FIG. 9B, where a further measurement for collision detection is performed. At S145, a current on the bus is measured. At S147, it is determined whether the current is above a predetermined threshold or not. If the current is above the predetermined threshold, the procedure jumps to S142. Else, the procedure proceeds to S146, where a supply voltage is applied and the procedure waits for a predetermined time interval. Thereafter, the procedure proceeds to S100. During transmission, optionally, the procedure may jump to S145 and follow the sequence illustrated in FIG. 9B. If it is determined at S147 that the current is below the predetermined threshold, the data transmission is interrupted and the procedure proceeds to S146. If it is determined at S147, that the current is above the predetermined threshold, the procedure proceeds to S144, where the transmission of the DiSEqC command is finished. After finishing the transmission of the DiSEqC command and before decreasing a level of the voltage applied to the bus at S150, the procedure may optionally jump to S145 and follow the sequence illustrated in FIG. 9B.

If it is determined at S147, that the current is above the predetermined threshold, the procedure proceeds to S150.

At S150 a level of the voltage applied to the bus is decreased.

At S160 the current is measured on the bus.

At S170 it is determined whether the current is above or below the predetermined threshold.

If the current is below the predetermined threshold (No) at S180, the supply voltage is applied and return to S100 is delayed for the second predetermined time interval. Thereafter, the process returns to S100 and the process sequence starting from S100 (Increase a level of a voltage applied to the bus) is repeated.

If the current is above the predetermined threshold (Yes) at S190 the supply voltage is applied to the bus.

According to a further embodiment, the receiver may further include a counter which counts the interrupted transmission processes. The receiver may be configured to entirely stop the transmission process after the counter has counted a predetermined number of transmission attempts.

Figure 9B:
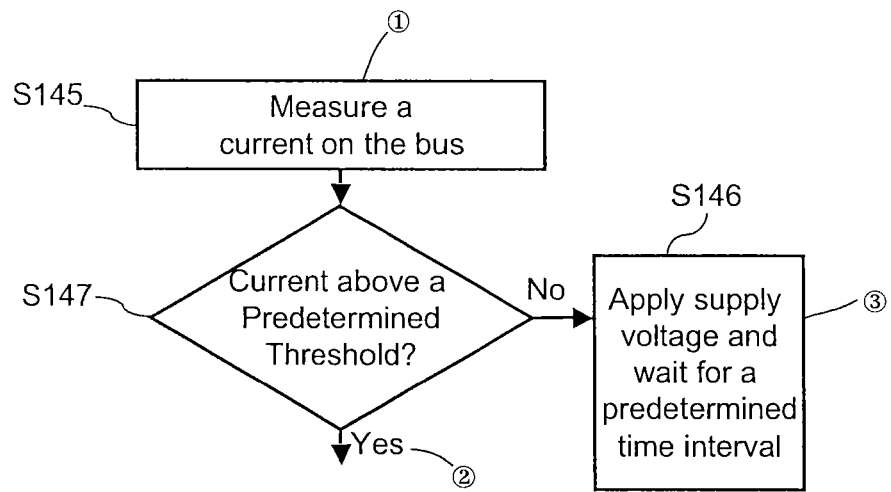
FIG. 9B illustrates a further portion of the process flow that may be included in the process flow of FIG. 9A.
Figure 9C:
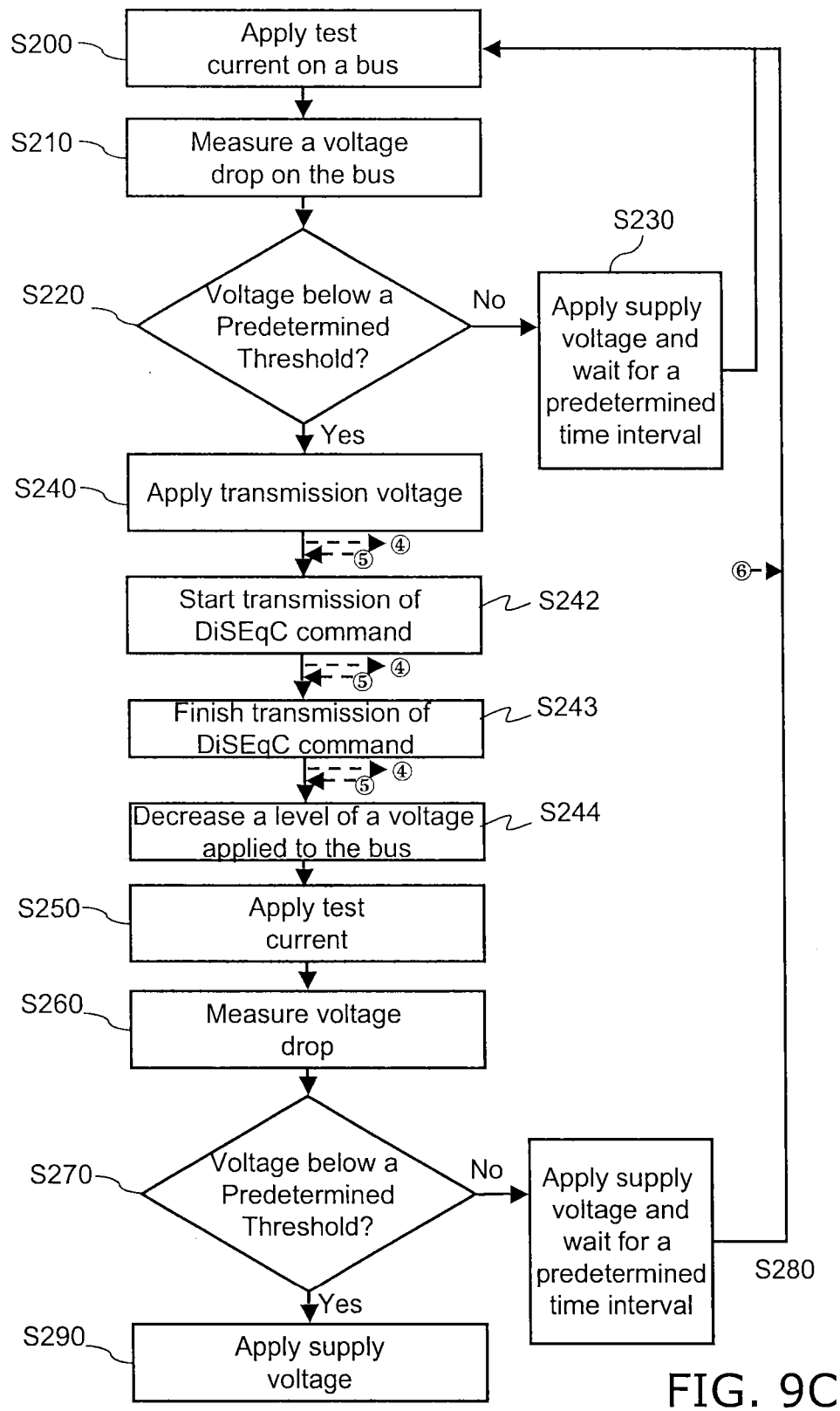
FIG. 9C illustrates one embodiment of a process flow of a method of detecting a signal activity and avoiding data collision by measuring a voltage drop before and after transmission of data.

FIG. 9B illustrates a process flow of a method of detecting command data, as e.g. DiSEqC control signals, on the bus and avoiding data collision by applying the test current on the bus and measuring the voltage drop on the bus.

At S200 the test current is applied on the bus.

At S210 the voltage drop is measured on the bus.

At S220 it is determined whether the voltage drop is above or below the predetermined threshold.

If the voltage drop is not below the predetermined threshold (No) at S330 the supply voltage is applied to the bus and return to S200 is delayed for the second predetermined time interval.

Figure 9D:
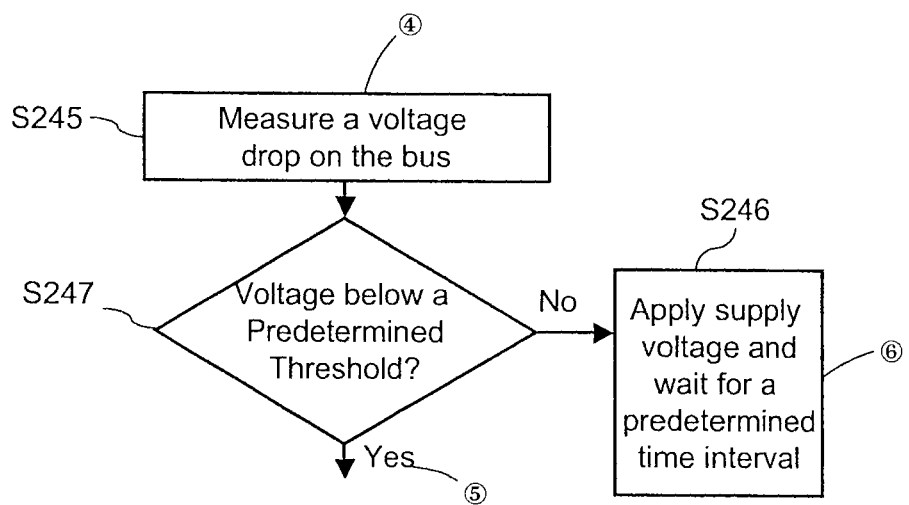
FIG. 9D illustrates a further portion of the process flow that may be included in the process flow of FIG. 9C.

If the voltage drop is below the predetermined threshold (Yes) at S240 the transmission voltage is applied. At S242, the transmission of command data through the bus to the SCIF is started. Optionally, before S242, the procedure may jump to S245 shown in FIG. 9D, where a further measurement for collision detection is performed. At S245, a voltage drop on the bus is measured. At S247, it is determined whether the voltage drop is below a predetermined threshold or not. If the current is below the predetermined threshold, the procedure jumps to S242. Else, the procedure proceeds to S246, where a supply voltage is applied and the procedure waits for a predetermined time interval. Thereafter, the procedure proceeds to S200. During transmission, optionally, the procedure may jump to S245 and follow the sequence illustrated in FIG. 9D. If it is determined at S247 that the voltage drop is larger than the predetermined threshold, the data transmission is interrupted and the procedure proceeds to S246. If it is determined at S247, that the voltage drop is smaller than the predetermined threshold, the procedure proceeds to S243, where the transmission of the DiSEqC command is finished. After finishing the transmission of the DiSEqC command and before decreasing a level of the voltage applied to the bus at S244, the procedure may optionally jump to S245 and follow the sequence illustrated in FIG. 9D. If it is determined at S247, that the voltage drop is smaller than the predetermined threshold, the procedure proceeds to S244.

At S250 the test current is applied on the bus.

At S260 the voltage drop is measured on the bus.

At S270 it is determined whether the voltage drop is above or below the predetermined threshold.

If the voltage drop is above the predetermined threshold (No) at S280 the supply voltage is applied and return to S100 is delayed for the second predetermined time interval.

If the voltage drop is below the predetermined threshold (Yes) at S290 the supply voltage is applied to the bus.

According to a further embodiment, the receiver may further include a counter which counts the interrupted transmission processes. The receiver may be configured to entirely stop the transmission process after the counter has counted a predetermined number of transmission attempts.

According to a further embodiment, a method for detecting a signal activity on a bus may comprise measuring a current on the bus, and determining a signal activity based on the measured current. For example, as illustrated in FIG. 9A, between steps S140 and S150, the voltage level is not changed before performing the respective measurements. Further, controllers may be operated at a comparatively high supply voltage, which may be at the upper boundary of the first predetermined voltage range. Accordingly, a signal activity on the bus may be determined by measuring the current even without changing the voltage.

Accordingly, a controller that is configured to transmit data to a bus of a receiver system, may comprise a voltage source configured to apply a voltage to the bus, a sensor configured to measure a current, and a transmitter configured to adapt a transmission process of transmitting data on the bus based on a signal activity, the signal activity being determined based on the measured current. Further, a receiver that is operable in a single cable system and that is configured to receive satellite signals, may comprise the controller as described above, and a processor configured to determine a signal activity based on the measured current.

FIG. 10 shows an example of a communication system 800. The communication system 800 comprises an interface 820 that receives satellite signals from an antenna 810 and transmits the received signals to receivers 81-1, 81-2, ... 81-N or controllers 83-1, 83-2, ... 83-8 via a bus 880. Within the context of the present specification, the term "bus" comprises the tree-like cable network that interconnects the receivers 81-1, 81-2, ... 81-N or controllers 83-1, 83-2, ... 83-8 with the interface 820. For example, the bus 880 may comprise the single cable 813, a power splitter or directional coupler 815 and further cables 84-1, 84-2, ... 84-N between the power splitter 815 and the receivers 81-1, ... 81-N or controllers 83-1, 83-2, ... 83-8. Any of the controllers 83-1, ... 83-8 may be implemented in the manner as has been described above with reference to FIGS. 1A and 1B. As is to be clearly understood, the communication system may also comprise controllers 83-1, ... 83-8 which are different from the controller described above.

Examples of the receiver 81 comprise a stand-alone receiver, a set-top box, a built-in component of a television, a DVD-recorder, a computer or others. The receiver 81 may, for example, be connected with a television apparatus. The interface 820 may be a single cable interface (SCIF) that may be embedded in a single cable router (SCR), a LNB (low noise block) or a suitable switch. The receiver 81 may integrate one or more demodulators. The antenna 810 may be any kind of antenna, which is configured to receive signals from communication satellites 817. Examples of the antenna 810 may comprise satellite dishes or other suitable antennas for receiving the signals. The antenna 810 may comprise several antenna devices, which may be, for example, assigned to different satellites 817. Nevertheless, as is clearly to be understood, one single antenna 810 may receive signals from a plurality of satellites. Usually, the antenna 810 receives signals over the broadband spectrum of the satellite signals (e.g. between 1 and 2 GHz). Generally, the signals received by the antenna may be assigned to banks, which are defined as a group of received contiguous channels which belong to a polarization and/or a band (for example, low band, high band, horizontal polarization, vertical polarization). The bandwidth of the single cable (coaxial cable) 813 may be divided into slots or user bands. Each demodulator being a component of a receiver 81-1, 81-2, ... 81-N may be allocated a slot. The interface 820 transmits signals to one of the receivers 81-1, 81-2, ... 81-N in the allocated slot. The interface 820 is remotely controlled by the receiver 81 via DiSEqC (digital bus satellite equipment control) commands.

The single cable connection 813 usually is implemented by a coaxial cable that may transmit both bidirectional data/signals and power. The structure and the functionality of the DiSEqC signals are explained in the respective literature referring to the standard. Usually, in order to select a desired channel of the satellite signal, the receiver 81 or controller of the receiver 81 sends a DiSEqC command to the interface 820. The DiSEqC command may include data that may comprise information about the bank (band, feed, polarization) that carries the desired signal, information about the frequency of the desired signal and information about the slot, on which the desired signal is expected.

The power splitter or directional coupler 815 may be operable to transmit the signals from the single cable connection 813 to each of the receivers 81-1, ... 81-N via cables 84-1 ... 84-N. In one embodiment, diodes 85-1, ... 85-N may be disposed between any of the receivers 81-1, ... 81-N and the power splitter or directional coupler 815. Generally, the communication system 800 may comprise up to eight receivers 81-1, ... 81-N. Nevertheless, it is to be appreciated that the communication system 800 may comprise more receivers. The communication system 800 comprises at least one receiver or a controller according to an embodiment of the present disclosure. The communication system 800 further may comprise one or more receiver which is not according to an embodiment.

Figure 11:
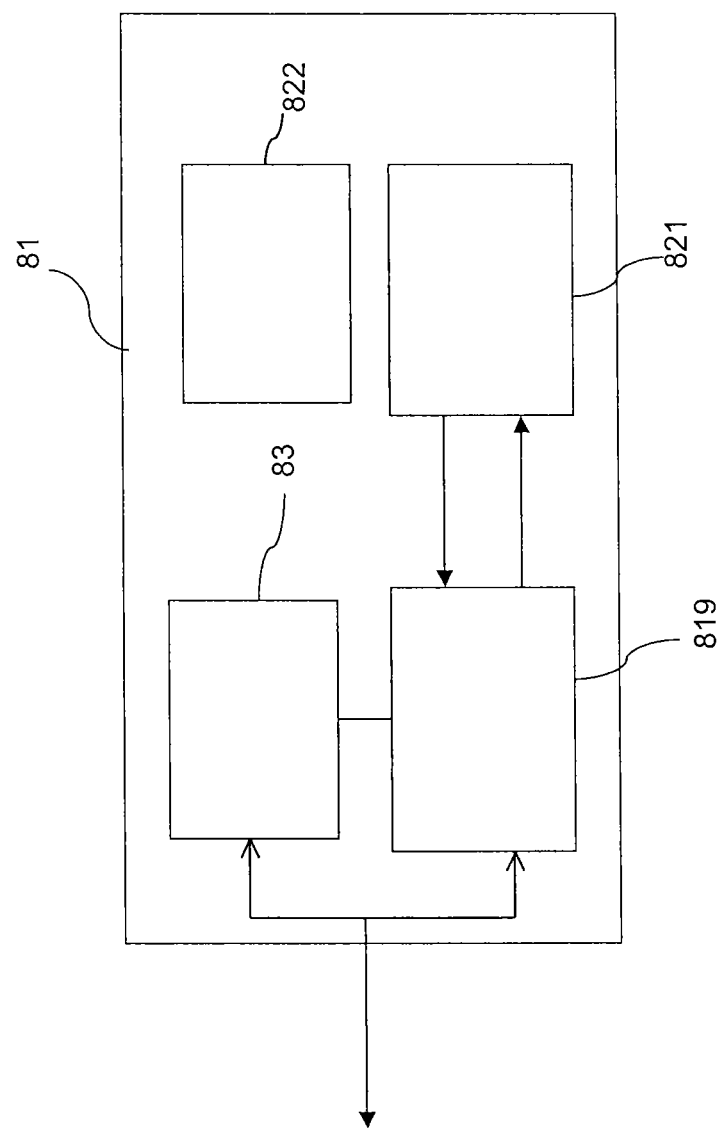
FIG. 11 illustrates an embodiment of a receiver according to an embodiment.

FIG. 11 shows elements of a receiver 81 according to an embodiment of the present application. The receiver 81 may be a satellite receiver. The general components of a receiver have been described in more detail in the prior art. In addition to the components that provide the basic functionality of the receiver, the receiver 81 may comprise a controller 83 and a processing device 819. The controller 83 may be implemented as is illustrated in FIGS. 1A and 1B, respectively. The receiver 81 may further comprise a memory 821. For example, the memory 821 may store the wait time interval which has been explained above with reference to FIGS. 6 and 7. The receiver 81 may further comprise an additional capacitance 822 or electrical components which may influence the voltage-time characteristic as has been explained above with reference to FIGS. 6 and 7. The memory 821 may also store the voltage-time characteristic of the controller. As is to be clearly understood, the controller 83, the processing device 819, and the memory 821 may perform special functionalities of the receiver. For example, the controller that performs the basic functionality of the receiver may additionally perform the functionality that has been described while referring to the embodiments. Alternatively, the controller 83 described may be a separate component of the receiver 81. Likewise, the general processor of the receiver may integrate the processing device 819 or simply perform the functionality of the processing device 819. Alternatively, the processing device 819 may be a separate component of the receiver 81. Part of the functionality described above as being performed by the controller or the processing device may be performed by any other component of the receiver. For example, the processing device 819 and the controller 83 may be comprise integrated circuits and/or programmed microprocessors. According to an embodiment, the controller 83 may be a commonly available controller, and the general processor of the receiver 81 may be configured to determine a signal activity based on the measured current.

Obviously, numerous modifications and variations of the present disclosure are possible in light of the above teachings. It is therefore to be understood that within the scope of the appended claims, embodiments may be practiced in a different way than specifically described herein.

Thus, the foregoing discussion discloses and describes merely exemplary embodiments. As will be understood by those skilled in the art, embodiments may be embodied in other specific forms without departing from the spirit or essential characteristics thereof. Accordingly, the present disclosure is intended to be illustrative, but not limiting of the scope, as well as other claims. The disclosure, including any readily discernible variants of the teachings herein, define, in part, the scope of the foregoing claim terminology such that no disclosed subject matter is dedicated to the public. Elements of the described embodiments may be combined with elements of other embodiments.

Further elements of the described method and devices are summarized by the following itemized list:

Item 1. A method for avoiding transmission collisions on a bus, comprising:
  applying a sensing voltage to the bus, wherein the sensing voltage is between a supply voltage and a transmission voltage, wherein the supply voltage is applied to the bus during non-transmission of data on the bus and the transmission voltage is applied to the bus during transmission of data on the bus;
  measuring a sensing current on the bus;
  adapting a transmission process based on the sensing current.

Item 2. The method according to Item 1, wherein the sensing voltage is applied to the bus and the sensing current is measured before transmission of data; and wherein adapting the transmission process includes starting the transmission of data after a first predetermined time interval starting after the sensing current is measured to be above a predetermined threshold.

Item 3. The method according to Item 2, wherein adapting the transmission process includes delaying transmission of data on the bus for a second predetermined time interval starting after the sensing current is measured to be at or below the predetermined threshold.

Item 4. The method according to any of Items 1 to 3, wherein adapting the transmission process includes starting to apply the sensing voltage after a third predetermined time interval starting after transmission of data;
  measuring the sensing current;
  repeating the steps of applying the sensing voltage and measuring the sensing current after a second predetermined time interval starting after the sensing current is measured to be at or below the predetermined threshold.

Item 5. The method according to any of Items 1 to 4, further comprising:
  measuring a further sensing current during transmission of data, wherein adapting the transmission process includes repeating transmission of data on the bus after a second predetermined time interval starting after transmission if during transmission of data on the bus the further sensing current is measured to be at or below the predetermined threshold.

Item 6. The method according to any one of Items 1 to 5, wherein the supply voltage is in a first predetermined voltage range, the transmission voltage is in a second predetermined voltage range, the sensing voltage is in a third predetermined voltage range, and the predetermined threshold is in a first predetermined current range.

Item 7. A method for avoiding transmission collisions on a bus, comprising:
  applying a test current to the bus;
  measuring a voltage drop on the bus; and
  adapting a transmission process based on the voltage drop.

Item 8. A controller, comprising:
  an interface adapted to be connected to a bus of a receiver system;
  a sensor, wherein the sensor is adapted to apply to the bus a sensing voltage and to measure a sensing current, wherein the sensing voltage is higher than a supply voltage, applied to the bus during non-transmission of data on the bus, and lower than a transmission voltage, applied to the bus during transmission of data; and
  a transmitter configured to adapt a transmission process based on the sensing current.

Item 9. The controller according to Item 8, wherein the transmitter is configured to transmit data to the bus if the sensing current is above a predetermined threshold.

Item 10. The controller according to Item 9, wherein the transmitter is configured to start the transmission of data after a first predetermined time interval starting after the sensing current has been measured to be above the predetermined threshold.

Item 11. The controller according to any one of Item 9 to 10, wherein the controller is configured to delay transmission of data on the bus for a second predetermined time interval starting after the sensing current has been measured to be at or below the predetermined threshold.

Item 12. The controller according to Item 8, wherein the controller is configured to start to apply the sensing voltage after a third predetermined time interval starting after transmission of data on the bus and to measure the sensing current; and
  the controller is further configured to repeat applying the sensing voltage and measuring the sensing current after a second predetermined time interval starting after the sensing current has been measured to be at or below a predetermined threshold.

Item 13. A controller, comprising:
  an interface adapted to be connected to a bus of a receiver system;
  a sensor, wherein the sensor is adapted to apply to the bus a test current and to measure a voltage drop at the bus; and
  a transmitter configured to adapt a transmission process based on the voltage drop.

Item 14. The controller according to Item 13, wherein the transmitter is configured to transmit data to the bus if the voltage drop is below a predetermined threshold.

Item 15. The controller according to Item 14, wherein the controller is configured to start the transmission of data after a first predetermined time interval starting after the voltage drop has been measured to be below the predetermined threshold.

Item 16. The controller according to Item 8, wherein the controller is configured to measure a further sensing current during transmission of data and to repeat transmission of data on the bus after a second predetermined time interval starting after transmission if during transmission of data on the bus the further sensing current has been measured to be at or below the predetermined threshold.

Item 17. The controller according to any one of Item 8 to 12 or Item 16, wherein the supply voltage is in a first predetermined voltage range, the transmission voltage is in a second predetermined voltage range, the sensing voltage is in a third predetermined voltage range, and the predetermined threshold is in a first predetermined current range.

Item 18. The controller according to any of Items 13 to 15, wherein the transmission voltage is in a first voltage range, the test current is in a second predetermined current range, and the predetermined threshold is in a fourth predetermined voltage range.

Item 19. A receiver including a controller according to anyone of Items 8 to 18.

Item 20. The method according to Item 1, further comprising:
measuring a further sensing current during transmission of data; and
generating decoded data based on the measured further sensing current, wherein adapting the transmission process includes repeating transmission of data on the bus after a second predetermined time interval starting after transmission if the decoded data differ from the transmitted data.

Item 21. A receiver including a controller according to item 13, further comprising a processor configured to determine a signal activity based on the voltage drop.

Item 22. A receiver operable in a single cable system, the receiver being configured to receive satellite signals via a controller interface, the receiver comprising:
a controller, being configured to transmit data to a bus of a receiver system via a controller interface, the controller including:
a voltage source configured to apply a voltage to the bus, the voltage source being configured to change a voltage applied to the bus; and
a sensor configured to measure a current after the voltage applied to the bus has been changed,
the receiver further comprising a processor configured to determine a signal activity based on the measured current.

Item 23. A receiver operable in a single cable system, the receiver being configured to receive satellite signals via a controller interface, the receiver comprising:
a controller, including:
an interface adapted to be connected to a bus of a receiver system; and
a sensor, wherein the sensor is adapted to apply to the bus a test current and to measure a voltage drop at the bus,
the receiver further comprising a processor configured to determine a signal activity based on the measured voltage drop.

Item 24. A method for detecting a signal activity on a bus, comprising:
measuring a current on the bus; and
determining a signal activity based on the measured current.

Item 25. A controller, configured to transmit data to a bus of a receiver system via a controller interface, the controller comprising:
a voltage source configured to apply a voltage to the bus;
a sensor configured to measure a current; and
a transmitter configured to adapt a transmission process of transmitting data on the bus based on a signal activity, the signal activity being determined based on the measured current.

Item 26. A receiver operable in a single cable system, the receiver being configured to receive satellite signals via a controller interface, the receiver comprising:
the controller according to Item 25; and
a processor configured to determine a signal activity based on the measured current.

CROSS-REFERENCE TO RELATED APPLICATIONS

The present application claims priority of EP patent application No. 12 007 384.6 filed on 26 Oct. 2012 and EP patent application No. 13 004 387.0 filed on 9 Sep. 2013, the entire contents of which are incorporated herein by reference.

The invention claimed is:

1. A method for detecting a signal activity on a bus, comprising:
increasing a level of a voltage applied to the bus from a lower voltage level to a higher voltage level;
measuring a current on the bus;
determining, using circuitry, a signal activity on the bus based on the measured current;
starting a transmission process of transmitting data on the bus in a case that the measured current is larger than a predetermined threshold value; and
decreasing the level of the voltage applied to the bus from the higher voltage level to the lower voltage level in a case that the measured current is at or below the predetermined threshold.

2. The method according to claim 1, wherein the current is measured after a wait time interval has passed after starting to increase the level of the voltage applied to the bus.

3. The method according to claim 2, wherein the wait time interval is determined based on a voltage-time characteristic of a controller applying the voltage.

4. The method according to claim 2, wherein the wait time interval is set taking into account a predetermined voltage range of receivers connected to the bus.

5. The method according to claim 2, wherein the wait time interval is set based on a voltage-time characteristic when increasing the level of the voltage applied to the bus.

6. The method according to claim 1, wherein the current is measured before transmission of data on the bus.

7. The method according to claim 1, the method further comprising delaying the transmission process of transmitting data on the bus for a predetermined time interval starting after the measured current is at or below the predetermined threshold.

8. The method according to claim 1, wherein the voltage level is increased to a specific sensing voltage between a supply voltage and a transmission voltage before the current is measured on the bus, wherein the supply voltage is applied to the bus during non-transmission of data on the bus and the transmission voltage is applied to the bus during transmission of data on the bus.

9. A controller, configured to transmit data to a bus of a receiver system, the controller comprising:
circuitry configured to:
increase a level of a voltage applied to the bus from a lower voltage level to a higher voltage level;
measure a current on the bus;
determine a signal activity on the bus based on the measured current;
start a transmission process of transmitting data on the bus in a case that the measured current is larger than a predetermined threshold value; and decrease the level of the voltage applied to the bus from the higher voltage level to the lower voltage level in a case that the measured current is at or below the predetermined threshold.

10. A non-transitory computer readable medium including executable instructions, which when executed by a computer cause the computer to execute a method for detecting a signal activity on a bus, the method comprising:

increasing a level of a voltage applied to the bus from a lower voltage level to a higher voltage level;

measuring a current on the bus;

determining a signal activity on the bus based on the measured current;

starting a transmission process of transmitting data on the bus in a case that the measured current is larger than a predetermined threshold value; and decreasing the level of the voltage applied to the bus from the higher voltage level to the lower voltage level in a case that the measured current is at or below the predetermined threshold.

\* \* \* \* \*